No. 628,336. Patented July 4, 1899.
P. O. KROTTNAURER.
FURNACE.
(Application filed Aug. 5, 1898.)
(No Model.) 3 Sheets—Sheet 1.

Witnesses, Inventor;
Paul O. Krottnaurer,
By Offield, Towle & Linthicum,
Attys.

THE NORRIS PETERS CO., PHOTO-LITHO., WASHINGTON, D. C.

No. 628,336. Patented July 4, 1899.
P. O. KROTTNAURER.
FURNACE.
(Application filed Aug. 5, 1898.)
(No Model.) 3 Sheets—Sheet 2.

Witnesses, Inventor,
Paul O. Krottnaurer,

No. 628,336. Patented July 4, 1899.
P. O. KROTTNAURER.
FURNACE.
(Application filed Aug. 5, 1898.)
(No Model.) 3 Sheets—Sheet 3.
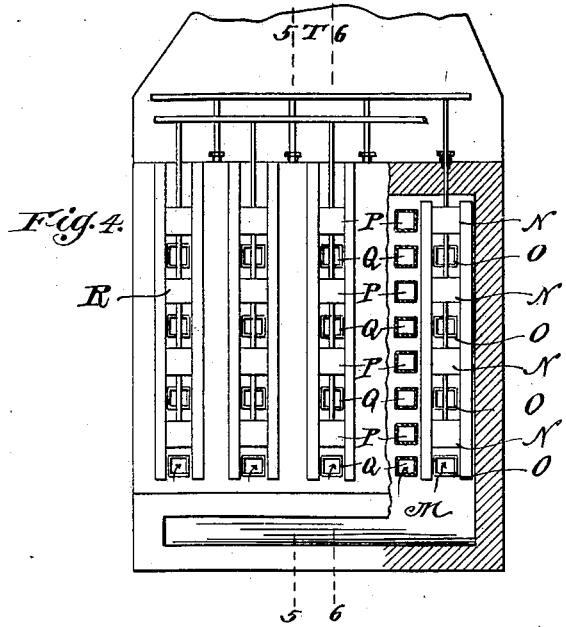
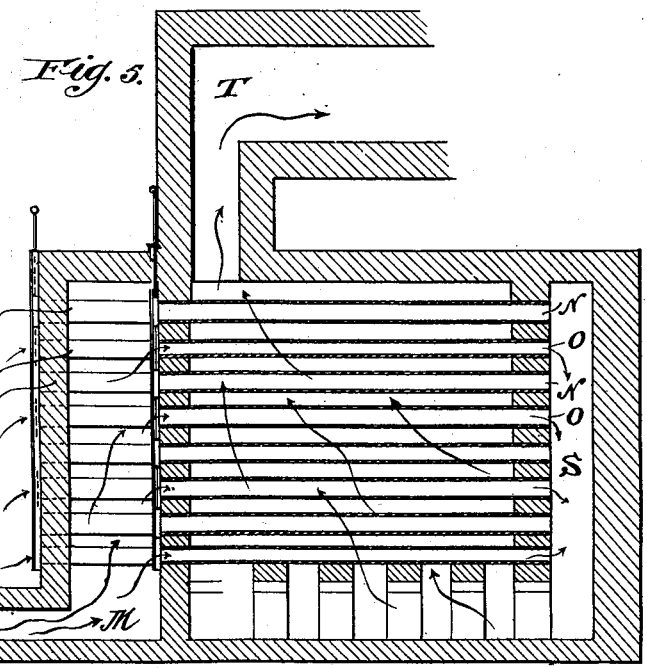

UNITED STATES PATENT OFFICE.

PAUL O. KROTTNAURER, OF CHICAGO, ILLINOIS.

FURNACE.

SPECIFICATION forming part of Letters Patent No. 628,336, dated July 4, 1899.

Application filed August 5, 1898. Serial No. 687,849. (No model.)

*To all whom it may concern:*

Be it known that I, PAUL O. KROTTNAURER, of Chicago, in the county of Cook and State of Illinois, have invented certain new and useful Improvements in Furnaces, of which the following is a specification.

This invention relates to the construction of furnaces, and has for its object to provide a furnace of simple and economical construction whereby an intense degree of heat may be produced at a small expense for fuel.

My furnace may be applied to a wide variety of purposes—as, for example, to steam-boilers, smelting, roasting, or calcining apparatus, and the like—each application requiring only slight modification in the form of the apparatus and such modification being easily within the skill of persons versed in the art.

In carrying out my invention I make use of the principle of the well-known regenerator of the Siemens type, wherein a body of air or gas is caused to pass through chambers which are alternately heated and allowed to cool.

The apparatus heretofore employed has been of costly construction and not well suited to many of the purposes to which my furnace, which is of more simple construction, may be readily adapted.

I have shown my invention in one of the simplest forms.

Figure 1:
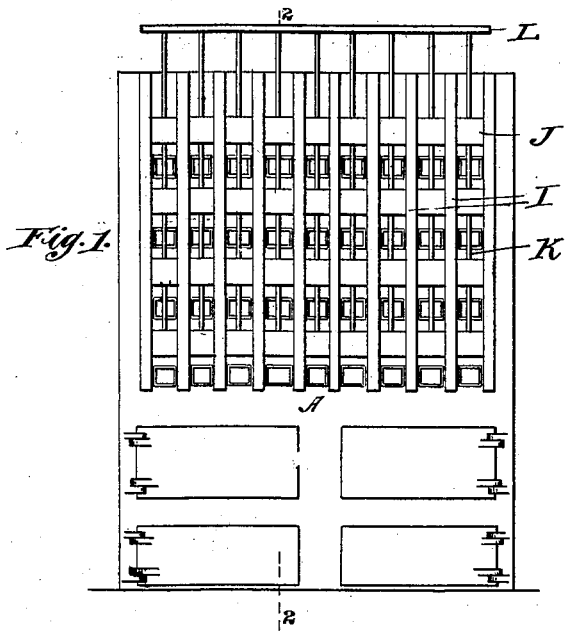
Figure 2:
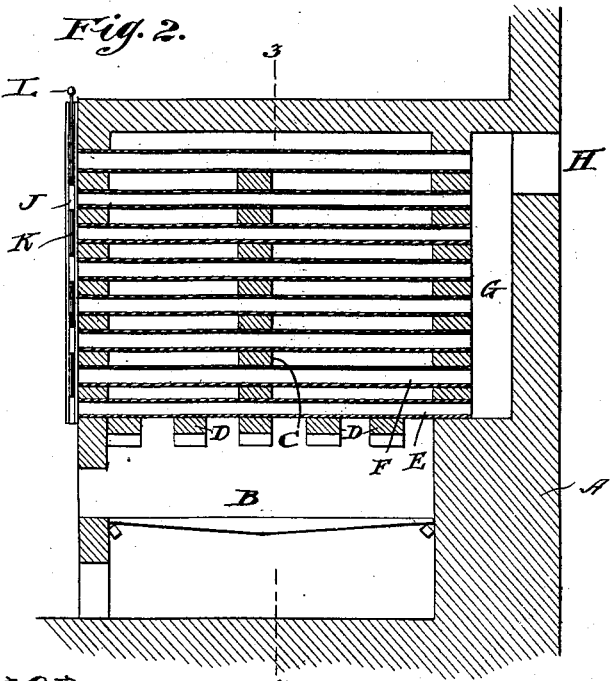
Figure 3:
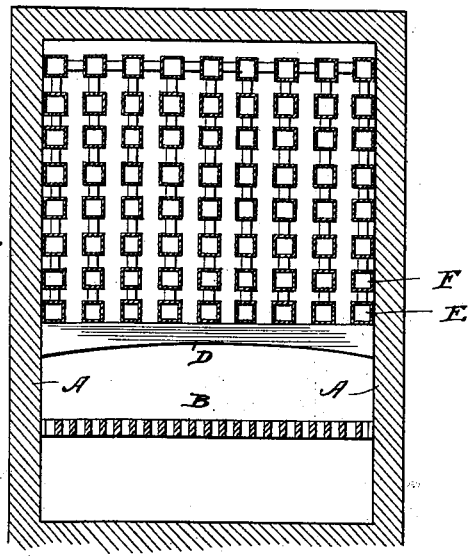
Figure 6:
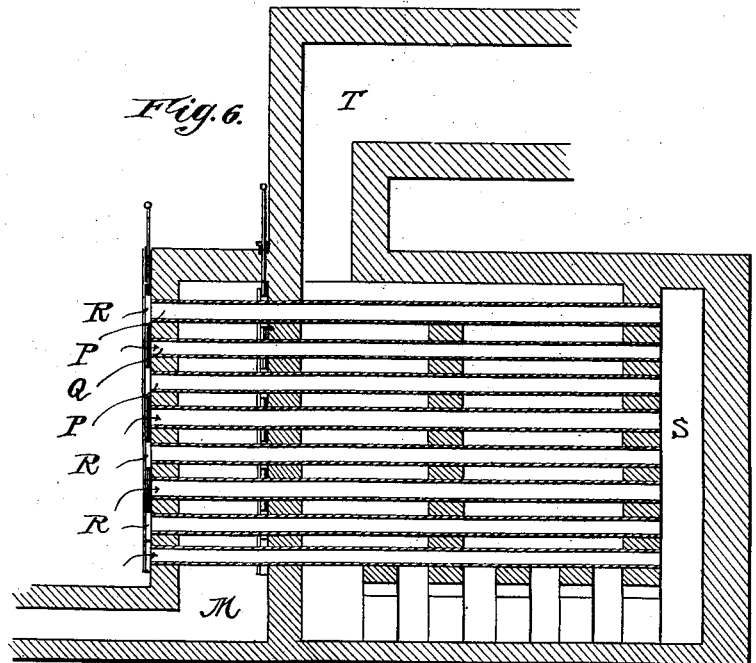

In the drawings, Figure 1 is a front elevation of the furnace, Fig. 2 a longitudinal sectional elevation thereof on the line 2 2 of Fig. 1, and Fig. 3 a transverse section on the line 3 3 of Fig. 2. Fig. 4 shows a furnace of modified construction, the view being a front elevation, partly broken away. Figs. 5 and 6 are sectional elevations on corresponding lines in Fig. 4.

In carrying out my invention I employ chambers, pipes, or passages adapted to be opened and closed in series and in alternate sequence, so that while one set of chambers is being utilized for the passage of the air or gas to be decomposed by the heat of the walls of the chambers or passages the other series of passages are being heated.

As shown in Figs. 1, 2, and 3 of the drawings, it is contemplated that the means of heating the generator shall be a solid fuel, and therefore I have provided a suitable casing or furnace-wall A, having grate-bars B therein to afford a fire-chamber above and an ash-pit below. Above the fire-chamber is arranged a superstructure, which may be composed of fire-brick or other refractory material, to provide the air or gas passages. As shown, the furnace-wall is continued to a suitable height above the grate-bars, and the interspace is provided with a bridge-wall C and with suitable bottom supports D.

E F represent a series of flues, tubes, or passages which alternate in vertical arrangement and which extend through the front wall of the furnace, their open ends terminating in the same vertical plane, while their rear ends open into a common duct or passage G, constituting a combustion-chamber and communicating with the fire-hole H. The flues or passages E F may also be constructed of fire-brick and may be of any desired form or cross-sectional area. On the front wall of the furnace are provided guide-strips I and forming ways, between which slide the gates or valves J, the valves or gates being connected in vertical series by the stems K and to the common operating-bar L, whereby the entire series of gates or valves may be shifted simultaneously. There are half as many gates as there are pipes or passages, and in one position the series of pipes E are covered, as shown in Fig. 2, while when the gates are shifted said series are uncovered at their forward ends and the series F are closed. By this means one set of the pipes or passages is constantly open to the atmosphere, while the other set is sealed thereto. The fire kindled upon the grate-bars B will highly heat the pipes or passages which are sealed to the atmosphere, and when highly heated the valves will be shifted and the air allowed to pass through such heated passages, the other series being closed and becoming heated. Obviously gas or oil burners might be substituted for the solid-fuel furnace. The combustion which takes place in the chamber above the grate-bars is not complete; but there is developed thereby a flame giving off considerable heat, which is utilized to heat the series of air tubes or passages and to furnish the necessary flame to ignite the products of the partial combustion and the highly-heated air entering through the air-passages, which when ignited in the chamber G produce intense heat.

My invention may be readily adapted for the use of gas instead of air. For example, some highly-inflammable gas which will produce a flame after being united with the proper quantity of heated air may be employed and the furnace so constructed that the flame can be readily utilized for heating the pipes or passages and the fire-box and all other heating means eliminated. The principle of the invention remains the same, however, in so far as it involves the employment of a series of tubes, pipes, or passages externally heated and adapted to be alternately used for the heating of the air or gas.

I have shown in Figs. 4, 5, and 6 a construction of furnace adapted to this purpose. In this construction let M represent a gas-supply passage opening into the series of tubes N O, which are provided with sliding gates or valves the same as described in the previous construction. Arranged in alternate vertical series with the gas-passages are a series of air pipes or passages P Q, which extend through the gas-passage M and are provided with gates or valves R, also adapted, as in the construction previously described, to be shifted vertically and to open and close alternately the two series of passages P Q. The air and gas passing to the rear of the furnace into the common chamber S will burst into a flame when united in said chamber and the flame will reverbrate, finding its way back to the outlet-stack T and passing through the spaces or interstices between the several series of pipes N O P Q.

While my invention in the broadest sense employs the same principle of operation as regenerator-furnaces in that air or gas is passed through chambers which are alternately heated, yet my construction of furnace enables the introduction and profitable employment of a different mode of working. In my furnace instead of introducing the heating agent into regenerator-chambers my heating-chambers are heated externally and the air or gas to be heated passes through said chambers and comes in contact with the externally-heated walls thereof. Furthermore, in my construction the heat is or may be constantly applied and the flowing air or gas is directed by the valves through some of the passages and prevented from passing through others of the passages, thereby permitting them to become highly heated in turn. This enables the economical working of the furnace and permits of such a simple construction thereof as to adapt it to a wide variety of uses with slight modifications of the typical forms illustrated in the drawings.

Among the modifications of which my invention is susceptible it may be mentioned that the furnace itself may be constructed of any desired materials. The number and arrangement of the air-passages may be changed or altered, and instead of passing air through the pipes or passages other gases may be passed therethrough and heated or superheated therein.

Various other modifications of the principle of my invention may be made within wide limits, and therefore without limiting myself specifically thereto

I claim—

1. A furnace of the type described, comprising in combination with a source of heat, air-tubes whose exteriors are exposed to said heat, said tubes being arranged in two or more sets or series, means for alternately opening and closing said sets or series, and said tubes being arranged to deliver the air heated therein to mingle with the escaping products of combustion, substantially as described.

2. A furnace of the class described, comprising in combination flues, pipes or passages arranged in two or more sets or series, of means for alternately opening and closing said sets or series, a heating means arranged to deliver the products of combustion externally upon said pipes or passages, and the latter being arranged to deliver the air or gas passing therethrough to mingle with the products of combustion, substantially as described.

3. A furnace of the class described, comprising in combination pipes or passages arranged adjacent and parallel to each other and in series, one end of said pipes or passages being adapted for communication with the atmosphere and the other normally open, movable gates or valves for alternately opening and closing the receiving end of said pipes or passages, and a heater having a combustion-chamber so located with reference to said pipes or passages that the products of combustion will pass among and externally heat said pipes or passages, a chamber into which the normally open end of said pipes or passages deliver and into which the products of combustion also deliver, substantially as described.

PAUL O. KROTTNAURER.

Witnesses:
HENRY HASPER,
C. H. DAY.